United States Patent Office 3,369,679
Patented Feb. 20, 1968

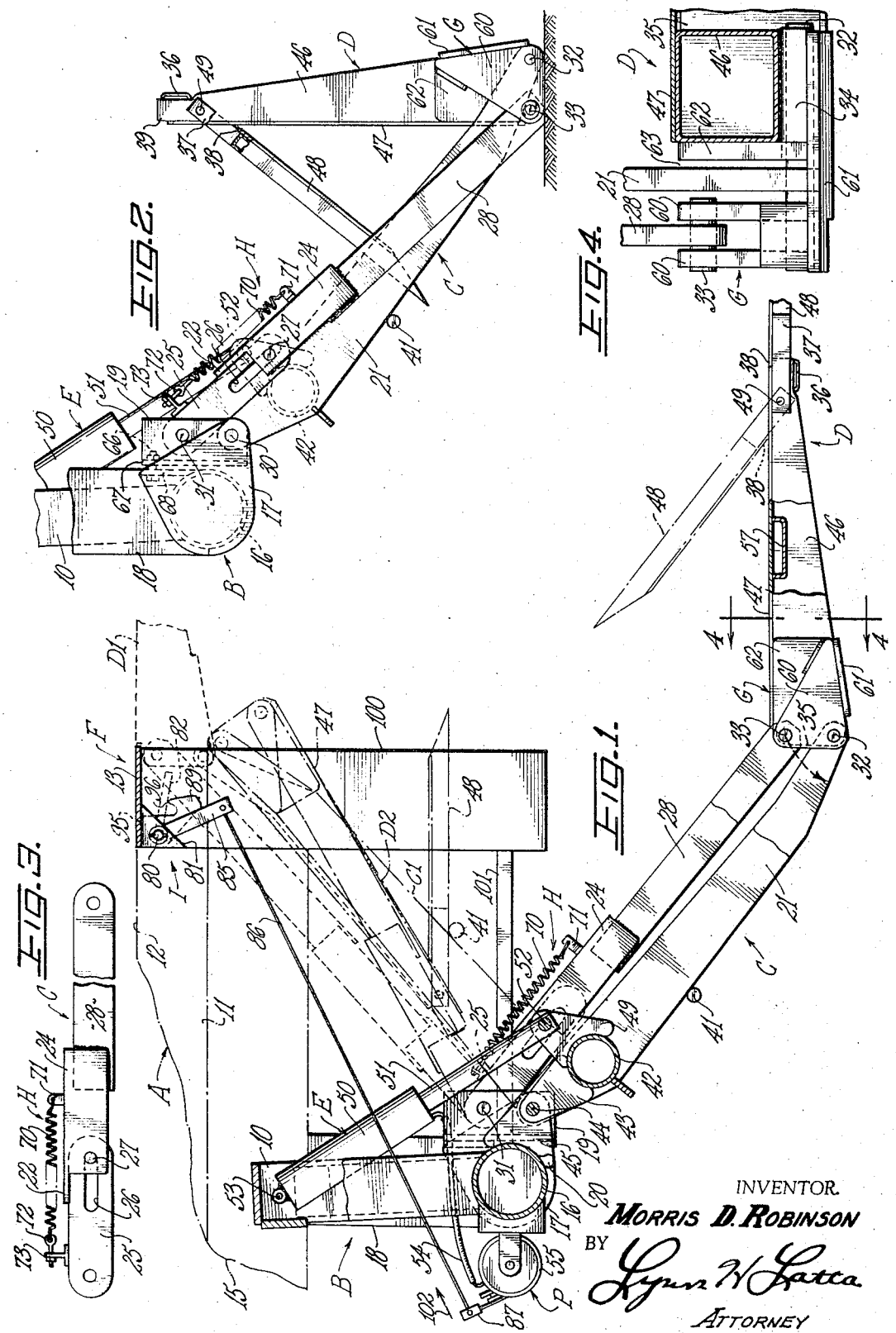

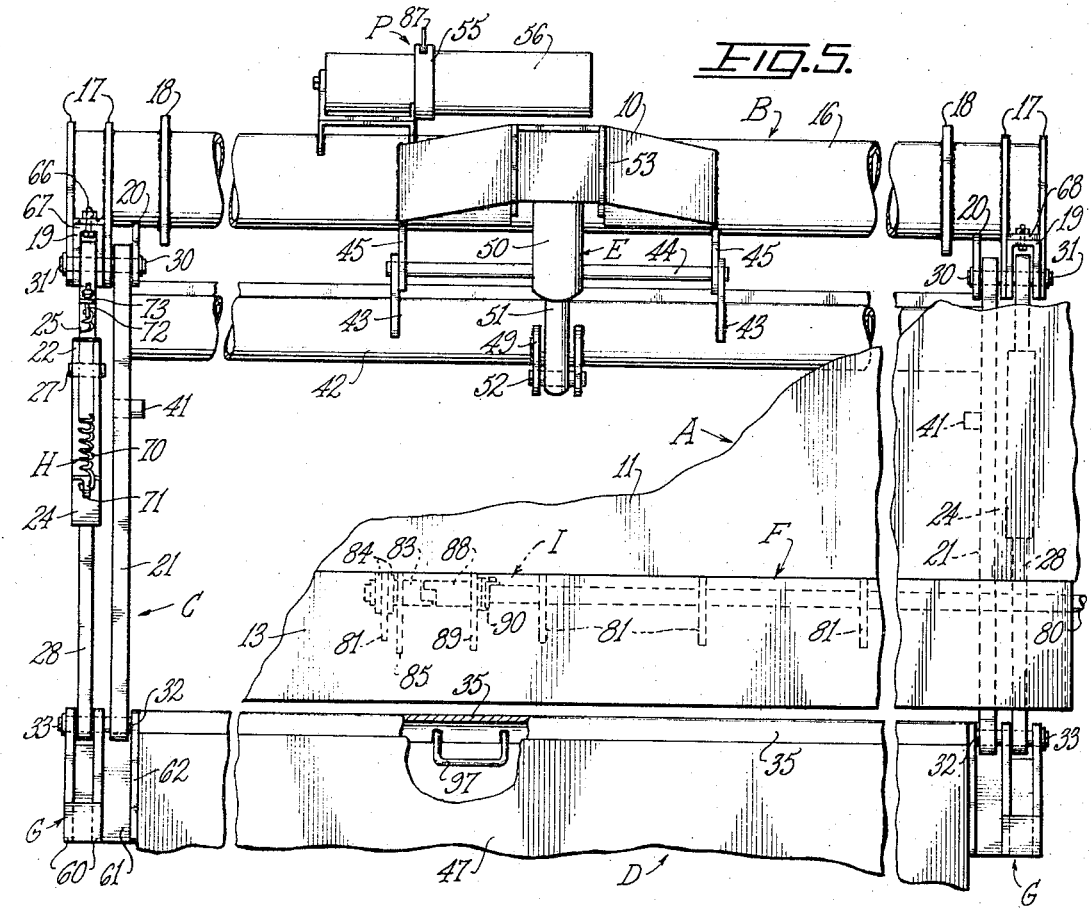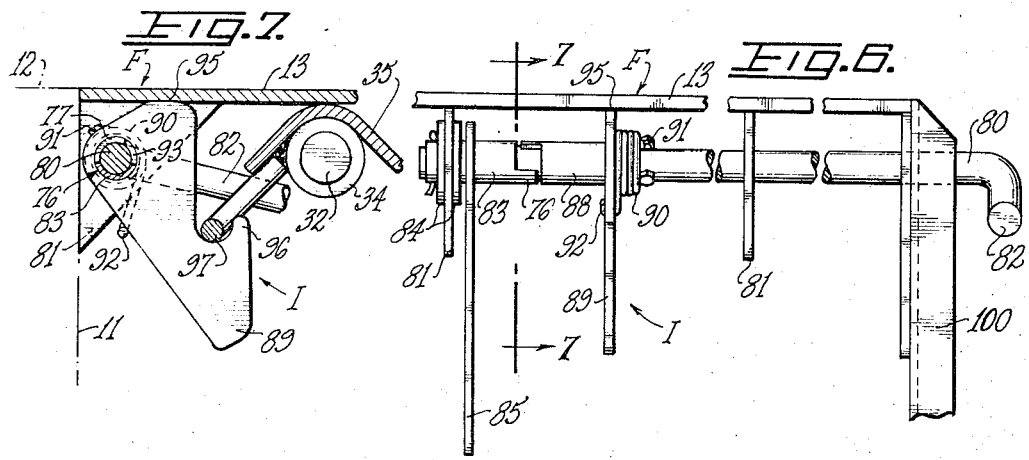

3,369,679
STOWABLE LIFT APPARATUS
Morris D. Robinson, 3721 W. 185th St.,
Torrance, Calif. 90504
Filed Nov. 19, 1965, Ser. No. 515,504
12 Claims. (Cl. 214—77)

ABSTRACT OF THE DISCLOSURE

A hydraulic lift for vehicles such as trucks, wherein a lift platform or deck is carried by parallel arm linkage in a leveled position during elevation from ground level to truck bed level by a hydraulic cylinder exerting an upward pull against the lift arms at a point located outwardly of a transverse horizontal fulcrum axis on which they are pivotally attached to the vehicle for vertical swinging movements. The parallel arms of the linkage are sectional, articulated and foreshortenable in a manner such as to provide for manually operated folding of the deck over and into the linkage for stowing it in a non-use position.

---

This invention relates to lift apparatus for carrier vehicles such as freight trucks, vans and the like. The invention relates particularly to the type of lift apparatus wherein a lift deck is carried by parallel-arm linkage for elevation from a loading position adjacent the ground to a transfer position leveled with the bed of the vehicle, and vice versa (for unloading); the linkage maintaining the deck substantially leveled in all positions of elevation and descent; and wherein the linkage includes means whereby the deck can be folded into the linkage and thence elevated to a stowed position beneath the bed of the vehicle. Objects of the invention are to improve upon the load-carrying strength, ruggedness and durability of the apparatus and to facilitate the manual folding of the deck into the linkage preparatory to moving it to the stowed position.

Toward the attainment of the foregoing general objects, the invention provides a load-lift apparatus:

(1) Having parallel arm lift linkage embodying compression-operating lift arms and parallel tension arms which are provided with improved means for foreshortening them in the folding of the deck for stowing;

(2) Wherein foreshortening of the tension arms is provided for by a telescoping construction involving limited longitudinal sliding of one arm section within another and with means for transmitting tension load from one section to the other in their position of maximum extension;

(3) Including spring-loading means acting in tension between the telescoping sections of the parallel arms, operative to assist in swinging the deck bodily upwardly during the deck-folding operation;

(4) Having improved outboard bracket means for connecting the parallel arm linkage to the deck heel, with the lift arms disposed inwardly of the tension arms; and wherein the load-carrying capacity of the linkage-to-deck connecting pivots is greatly increased and the possibility of failure thereof is substantially eliminated;

(5) Embodying a truck floor extension which is provided with amplified load-supporting capacity by engagement of the deck heel against its underside in the stowed position of the deck, such amplified load capacity being utilized in dock-loading with the deck in stowed position.

Other objects and advantages will become apparent in the ensuing specification and appended drawing in which:

FIG. 1 is a vertical sectional view of a lift embodying the invention as installed for operation at the rear end of a truck, a cross section of which is shown in phantom; the lift being shown in full lines in a lowered position from which a stowing operation may be started, a preliminary fold in the stowing operation and the approach to the stowed position being shown in phantom (dot-dash lines) and an elevated position, from which its load can be transferred into the truck also being shown in phantom (dotted lines);

FIG. 2 is a side elevational view of the same illustrating a second fold in the stowing operation;

FIG. 3 is a detail side elevational view of one of the parallel tension arms;

FIG. 4 is a detail transverse sectional view taken on the line 4—4 of FIG. 1, showing the outboard bracket;

FIG. 5 is a fragmentary plan view of the lift;

FIG. 6 is a fragmentary rear elevational view of the control mechanism;

FIG. 7 is a detail cross sectional view of the same, taken as indicated by the line 7—7 of FIG. 6.

Referring now to the drawings in detail, I have shown therein, as an example of one form in which the invention may be embodied, a lift apparatus comprising, in general, a mount frame B adapted for installation beneath the bed of a truck A; a parallel arm linkage C fulcrumed upon the mount frame B; a sectional deck D carried by the outer ends of the arms comprising the parallel arm linkage C; a hydraulic actuator E operating between the mount frame B and the parallel arm linkage C for elevating the linkage C and the deck D; a floor-level extension F for the rear end of the bed of truck A; outboard bracket units G connecting the linkage C to the deck D; spring-loading means H acting in tension between sections of linkage C for assisting in the upward folding of the deck; a control assembly I including a valve and latch actuator handle and a safety latch means for preventing sagging of the deck-linkage assembly from stowed position; and a hydraulic power package (pump and valve assembly) indicated generally at P.

The essential parts of truck A to which the invention is particularly related are the bed 11, which provides an elevated floor 12 onto which loads are to be moved from the lift deck D when elevated so as to be leveled with the floor; and frame 15 to which the mount frame B is attached. The invention deals with the specific problem of folding the left apparatus into a sufficiently compact condition to bring substantially all portions thereof beneath the floor area including the area of extension F, as well as the problem of bringing the heel of deck D snugly close to the extended floor margin in the elevated, load-transfer position of the deck shown in dotted lines in FIG. 1. Extension F of yoke shape (FIG. 6) is secured by suitable means (e.g., welding) to the rear end of bed 11. It includes a floor plate 13 which can be installed flush with truck floor 12, or at a different level, as may be required.

Mount frame B comprises a torque tube 16 having a pair of mount plates 18 (FIG. 1) secured to its upper side, projecting upwardly and providing for attachment of the mount frame to truck frame 15; pairs of spaced mount ears 17 and associated mount ears 20 for pivotal support of the ends of the arms of linkage C; clevises 19 adjustably mounted between ears 17 for adjustable support of the inner ends of one set of arms of linkage C; an actuator bracket 10 secured to and rising from the center of the torque tube 16; and a pair of inboard mount ears 45 aligned with ears 20.

Linkage C comprises a set of lift arms 21 operable in compression; and a set of parallel arms, operable in tension and of foreshortenable telescoping construction, each comprising a scabbard 24 of flat rectangular channel cross-section and a blade 25 (FIG. 3) of flat bar stock having a longitudinal slot 26 pierced by a pin 27 bridging between and anchored in the sides of scabbard 24. Each scabbard 24 has an integral stop lip 22 projecting over blade 25 at its one end, and a tail 28 secured therein and extending therefrom in the plane of blade 25. The slot 26 is of such a length and so positioned that engagement of the pin 27 against its outer end will provide a connection between the arm sections 24 and 25 such as to provide its tension load-carrying function. This is the position of full extension of the parallel arms. In the various foreshortened positions of the parallel arms, they function as guide arms without any load-carrying function. The linkage arms are arranged in adjacent paired relation, one pair at each side of the linkage, each pair comprising a lift arm 21 and a parallel arm 24, 25, 28 located laterally outwardly of the lift arm 21.

The lift arms 21 (FIG. 2) have their ends fulcrumed on pivots 30 each supported in a respective pair of mount ears 17, 20 (FIG. 5). The parallel arm blades 25 have their corresponding ends mounted on pivots 31 spaced substantially vertically above the respective pivots 30 and carried by the clevises 19. The linkage arms have outer, swinging ends provided with respective pivots correspondingly spaced vertically during lift operation, said outer end pivots consisting of lower pivots 32 connecting the ends of lift arms 21 to the heel of deck D at the lower side thereof when leveled, and upper pivots 33 connecting the ends of scabbard tails 28 to the heel near the upper level of the deck. Thus the linkage arms are mounted to frame B for upward swinging in parallel relationship so as to maintain their outer end pivots parallel to pivots 30, 31. The lift arms 21 are provided with rests 41 projecting inwardly from the respective sides of the linkage sufficiently to engage the deck D and to support it with reference to the linkage when folded to stowed position as hereinafter described.

The lift arms 21 are integrally joined by a cross bar 42, preferably in the form of a cylindrical tube for maximum strength. The lift linkage further includes a pair of short arms 43 (FIG. 1) which are secured to cross bar 42 and are spaced so as to embracingly engage the mount ears 45 and are connected thereto by a hinge pin 44 which is aligned with the linkage pivots 30. The cross bar 42 is also provided, at its center, with a pair of upwardly projecting spaced clevis ears 49. The arms 43 and ears 49 are secured to the cross bar 42 by any suitable means such as welding.

At this point it may be noted that the lift operation of this apparatus in elevating a load from a loading position of the deck D shown in full lines in FIG. 1, upwardly to the unloading position shown in dotted lines at D1 in FIG. 1 (lift being applied to the linkage C by the actuator E) is essentially the same as that of well known lift apparatus now in extensive use, and in this respect, the invention provides a combination of means for applying lifting power and for simultaneously maintaining the deck D in a leveled position, equivalent to and fully as satisfactory and durable as that of the known lift mechanisms. In addition, the invention provides improved stability and ruggedness in the linkage connections, and improved means to place the deck in a position stowed beneath the truck bed when not in use, with the deck folded over into the arms of the linkage, including the tension loading assist means which will be described hereinafter.

It may also be noted that the sectional construction of parallel arms 24, 25 provides a lost-motion connection between the pairs of pivots 31, 33 which are the upper pivots of the linkage when in load-lifting positions, permitting the upper deck pivots 33 to approach the upper mount pivots 31 in an orbiting movement of pivots 33 around lower deck pivots 32 to accommodate upward folding of deck D toward the mount pivots 30, 31. Other lost-motion linkage connections known in the art (e.g., as provided by articulation of the parallel arm sections for jackknifing foreshortening) can be employed in lieu of the slidable telescoping foreshortening connections; or lost-motion connections between pivots 33 and outboard brackets G can be substituted for those shown.

The clevises 19 are mounted at their lower ends on the pivots 30 for limited horizontally swinging adjustment of their upper ends, for the purpose of shifting the upper mount pivots 31 with reference to the lower mount pivots 30. This will effect a corresponding adjustment of the linkage-to-deck pivots 33, 32 which may be utilized for leveling the deck. The adjustment may be effected by means of adjustment bolts 66 (FIG. 2) extended through opposed vertical web portions 67 (shown in phantom) of clevises 19 and 68 of mount ears 17 and limiting the separation of these web portions under the outward pull of pivots 31 responding to the weight of the deck as applied through the linkage arms.

Deck D (FIG. 6) is composed of an inward section embodying trapezoidal side arms 46 (e.g., of channel section, FIG. 4) bridged by cross bars 35, 57 and 36 to provide a frame structure which is covered by a floor sheet 47; and an outward extension section 48 hinged to the section 46, 47 by hinge pivots 49. Cross bar 35, of channel form, with its respective side flanges extending around pivot 32 and around the axis of pivot 33, provides the heel of the deck. The deck section 48 is of suitably rigid construction which may include a floor sheet covering a rectangular box frame, and the hinged connection is provided for by a pair of hinge arms 37 secured to the respective sides of the box frame and projecting in embracing relation to the adjacent portion of deck section 46, 47.

The floor sheet of deck section 48 has a transverse marginal lip 38 adapted to seat downwardly against a supporting shoulder 39 (FIG. 2) provided by the transverse marginal portion of outer cross bar 36 projecting beyond the adjacent margin of the floor sheet 47. The axis of hinge pivots 49 is disposed sufficiently forwardly of this supporting shoulder so that adequate cantilever support will be provided for by the outward deck section 48, with its floor sheet leveled with the floor sheet 47 of the inward section. From this supported position, the deck section 48 can be lifted and swung inwardly over the deck section 46, 47 as indicated in phantom in FIG. 1.

The wider ends of the frame side arms 46 of the inward deck section are coupled through the outboard brackets G to the rearward ends of the arms of linkage C by the pivots 32 and 33, located at the lower and upper corners respectively of the outboard brackets G, and mounted thereby to the frame sidearms 46. The pivots 32 are fixed in sleeves 34 (FIG. 4) which in turn are fixed in the ends of the heel channel cross bar 35 bridging between and bracing the heel ends of arms 46. Pivots 32 may constitute the ends of stub shafts extending through the outboard unit G to add support thereto as indicated in FIG. 4.

Hydraulic actuator E is a conventional unit comprising a cylinder 50 having a piston (not shown) slidable therein and attached to one end of a piston rod 51 the other end of which is connected by a pivot pin 52 (FIG. 2) between the clevis ears 49 of linkage cross bar 42. At its upper end, cylinder 50 is anchored on a pivot pin 53 carried by the upper end of actuator bracket 10.

A suitable hydraulic connection 54 to the lower end of cylinder 50 provides for introducing hydraulic fluid under pressure below the actuator piston to draw the piston rod 51 into the cylinder. The pivotal connection 52 between the piston rod and the lift linkage C is disposed outwardly from the pivots 30, 44 connecting the linkage to the torque tube 16, and thus the upward pull of the actuator is effective to swing the lift arms 21 upwardly. A manually-operable valve, built into a suitable power-operated pump 55 (FIG. 5) embodied in power package P, connects the line 54 to the pump for delivering hydraulic fluid under pressure from a reservoir 56 to actuator E. Power package P is mounted on torque tube 16 as shown.

Outboard brackets G provide an important improvement in connecting the lift linkage C to the deck heel, where the lift linkage arms are located outwardly of the side extremities of the deck to permit the deck to be folded into the linkage (between the lift arms). Hitherto it has been considered necessary to arrange the compression arms of the linkage outwardly of the tension arms in order to avoid interference between the deck and the linkage during folding of the deck into the linkage and the elbow-hinging or telescopic foreshortening of one pair of arms for achieving such folding by orbiting one set of the linkage-to-deck pivots (32, 33 in the present construction) about one another. In the present invention, the outboard brackets G make it possible to locate the parallel arms 24, 28 outwardly of the lift arms, a desirable arrangement to facilitate application of lift directly to the lift arms by actuator E; and at the same time, provides a very sturdy anchorage for the deck pivots, and an arrangement in which the deck pivots can orbit without interference. Each of the outboard brackets G (FIG. 4) comprises a pair of spaced parallel vertical bracket fingers 60 of triangular plate form having base margins secured to the outward end portion of an outboard bracket arm 61 in the form of a rectangular plate. The inner end of bracket arm 61 is secured to the lower margin of a trapezoidal attachment plate 62 the inner face of which is secured to a respective side arm 46 of deck D adjacent its heel. The bracket arm 61 functions as a cantilever support for the pair of bracket fingers 60 which are separated from the attachment plate 62 by a space 63 in which the outer end of lift arm 21 is received as the deck is folded toward stowed position (FIG. 2). Arms 21 are pivoted in the lower extremities of spaces 63 upon the pivot pins 32 which bridge between the attachment plates 62 and the nearest outboard bracket plates 60 and have their ends mounted in these respective plates so as to transmit bracing support to the plates 60. The end of each scabbard tail of the parallel arms is received between the upper corners of a respective pair of outboard bracket fingers 60, and its pivot 33 consists of a pin bridging between those corners and having its ends mounted therein. The pivot pin 33 does not extend sufficiently into the space 63 to obstruct it. Thus it is possible for the lift arms 21 to enter the spaces 63 without interference from the pivots 33, during the folding movement of the deck from its partially open position shown in FIG. 2 to its position completely folded into the linkage as shown in FIG. 1 at D2. In this folding movement, when the deck has reached the position shown in FIG. 2, the deck section 48 will establish contact with rests 41 of lift arms 21 to support the deck in the linkage. The inward finger 60 (nearest the attachment plate 62) can optionally be eliminated and the pin 33 supported only at its outer end in outer finger 60 which in this event can be made somewhat heavier to furnish adequate support by itself.

Tension loading units H are disposed above the respective tension arms 24, 25 (FIG. 3) each loading unit comprising a coil spring 70 having one end anchored to a bracket 71 secured to the upper side of scabbard 24 and having its other end attached, by means of an eye bolt 72, to a T-bracket 73 secured to the upper side of blade 25. Spring 70 has as its main function to assist the upward folding of the deck D into the linkage after the extension section 48 has been flipped upwardly and forwardly to the position indicated in broken lines in FIG. 1. The springs 70, which are stretched under tension between the anchorage brackets 71, 73, preload the sections of the parallel arms for contraction to foreshortened condition in which the parallel arm-deck pivots 33 are moved toward the mount frame B around lift arm-deck pivots 32. Thus the tension units H provide a spring-assist to the operator, who by lifting with a force less than fifty pounds against the outer extremity of the main deck section 46, 47 (after having flipped the extension 48 over the main deck section) will be able to move the deck D to the first stage folded position shown in FIG. 2, in which the extension section 48 extends downwardly through the linkage C. A substantial portion of the lifting force required for swinging the deck upwardly to this position is provided by the tension units H. In the upending of the deck from the extended position of FIG. 1 to the position of FIG. 2, the upper deck-heel pivots 33 will orbit downwardly and rearwardly around the lower pivots 32, as indicated by the arrow in FIG. 1. when the axis of pivots 33 reaches a "dead center" position in the common plane of the axes of pivots 31 and 32, the spring-generated moment acting on pivots 33 as indicated by this arrow, will have been reduced to zero and the axes of pivots 31, 32 will have reached their limits of closest approach. As the deck D is moved on from the up-raised position of FIG. 2 to the stowed position shown in broken lines in FIG. 1, the continued orbiting of pivots 33 below the common plane of pivots 31, 32, will draw the pivots 33 away from pivots 31, drawing apart the sections 24, 25 of the parallel arms against the pull of tension unit H and stretching the springs 70. When the operator subsequently lifts the deck D from the stowed position to the upraised position of FIG. 2 (after having first lowered the linkage C from the raised position shown in phantom in FIG. 1 to the lowered position) the tension unit H will provide an assist for such lifting movement. Thus it will be apparent that the tension unit will assist the operator both in the folding and the unfolding of the deck toward the upraised position of FIG. 2, which is approximately a neutral position in relation to the action of tension unit H.

The tension units H have the further function of maintaining alignment between the sections 24 and 25 of the parallel arms, their pull being exerted above the common axis of guide pins 27 and thus tending to swing the arm sections 24 upwardly about the guide pins 27. Such upward swinging movement of the arm sections 24 relative to the blades 25, however, is prevented by the projecting stop lips 22 which are slidably engaged against the upper sides of the blades 25. Thus, the tension units H and the stop lips 22 cooperatively maintain the sections of the parallel arms in alignment for sliding, telescoping movements between the sections.

In operating the lift to the stowed position, after having manually lifted the deck to the position shown in FIG. 2, the operator then operates the hydraulic actuator 50 to raise the linkage C to the elevated position shown in broken lines in FIG. 1 at C1. During this elevating movement, the deck will drop further into the linkage C until the extension section 48 comes to rest against the rests 41. From the position C1, the linkage and deck are elevated further and secured by the latch mechanism as described more fully hereinafter.

Control and latch mechanism I (FIG. 5) comprises a crank shaft 80 rotatably mounted in brackets 81 depending from floor extension 13 and having at one end a control handle 82 located at one side of the truck. At its other end, crank shaft 80 extends into and is secured to a dog-clutch sleeve 83 which in turn is rotatably mounted in one of the brackets 81, and positioned by end thrust washers 84 thereon. Adjacent to one of the washers 84 is a control lever arm 85 which is connected by a link 86 to an actuator lever 87 of a valve of pump unit P. Dog-clutch sleeve 83 has a projecting dog 76 which engages a dog 77 (FIG. 6) on a hub 88 of a latch hook 89 and is normally held in engagement therewith by a torsion spring 90 one end of which is secured at 91 to the crank shaft 80 and the other end of which is secured at 92 to the hook 89. This spring-loaded normal engagement between dogs 76 and 77 is on the back of the assembly as seen in FIG. 7, a lost-motion gap 93 being provided between the dogs 76 and 77 on the forward side of the assembly. The spring-loading (indicated by the arrow in FIG. 7) maintains the hook 89 in a position projected rearwardly away from the truck bed as shown in FIG.1, this position being determined by limiting engagement of a heel portion 95 of hook 89 beneath the truck floor extension 13. Such engagement also determines the normal position of valve actuator arm 85 as shown in FIG. 1, the valve lever being thereby disposed in a valve-closing position, also shown in FIG. 1.

In deck D (FIGS. 5 and 7) there is attached to heel cross channel 35 an eye-yoke 97 which is positioned so as to be intersected by the vertical plane of hook 89. As the deck is elevated to its final stowed position, upwardly of the position D2 of FIG. 1, the eye-yoke 97 will engage the outward edge of hook 89, deflect the hook forwardly toward the truck bed 11, and finally clear the point of the hook finger 96 of hook 89, whereupon the hook will be moved rearwardly by the loading spring 90 so as to establish hooking engagement with the eye-yoke 97 in the event the deck should sag downwardly from its position of maximum elevation. Normally, when the deck has been fully elevated to the stowed position, the valve unit P is operated to lock the hydraulic fluid in the actuator E, so that the apparatus is held in its stowed position by the actuator E rather than by the hook 89. The latter operates as a safety feature to hold the deck in the stowed position in the event of leakage past the valve which could permit the actuator to relax its support.

In the stowed position of the deck (FIG. 7) the deck heel engages beneath the floor extension 13 and provides a solid support therefor, and the invention contemplates the use of the stowed deck for supporting heavy loads transported across the deck extension 13 when the truck is backed up to a loading dock. Further in this connection it should be noted that the heel of the deck is completely covered by the floor extension 13 when in the stowed position, so that the rear margin of the extension 13 can approach to maximum closeness to a loading dock. The floor extension 13 has its ends secured to bumpers 100 extending downwardly therefrom to protect the deck against damage from impact with a dock. The lower ends of bumpers 100 are braced by tie-rod struts 101 anchored to the ends of torque tube 16.

In normal load-elevating operation of the apparatus, the control handle 82 as it moves upwardly, swings the valve actuator lever 85 counterclockwise as viewed in FIG. 1, moving the valve lever 87 as indicated by arrow 102, to the position for admitting hydraulic fluid to actuator E, thus effecting the load-elevating movement of the deck. During such actuation of crank shaft 80, spring 90 yields while hook 89 remains fixed in its normal position.

The deck can be locked in its elevated load-carrying position by returning the control handle to its normal neutral position, locking the fluid in the actuator E.

For lowering the deck from its load-carrying position D1, the control handle 82 is moved downwardly below its normal position, opening a by-pass connection in power package P whereby fluid is permitted to bleed out of the actuator E back to the reservoir 56. The deck and linkage will return to lowered, loading position by gravity.

In moving the deck from its stowed position to its lowered position of FIG. 2 (preparatory to extending the deck to its load-receiving position of FIG. 1) the control handle 82 is moved downwardly, such movement being transmitted directly to the valve actuator 85 and thence to the valve for opening the valve to release fluid from the actuator E; and such movement is also transmitted through the interengaging dogs 76, 77 of FIG. 6 to the latch hook 89 to shift the latter downwardly and forwardly to a position releasing the deck D for downward swinging movement.

I claim:

1. Lift apparatus comprising: a load-carrying deck; parallel arm linkage having at one end means including vertically-spaced deck pivots connecting it to said deck and at its other end having means including vertically-spaced mount pivots; a mount including said mount pivots, for mounting said other end beneath an elevated floor for upward swinging of said deck to a position extending horizontally outwardly from a margin of said floor, said linkage comprising lift arms disposed in laterally-spaced planes outwardly of the sides of the deck and closely adjacent thereto, and parallel arms disposed laterally outwardly of said lift arms with their deck pivots disposed above the deck pivots of the lift arms; said lift arms and parallel arms being positioned for movements in vertical planes that are laterally spaced so that said arms may attain crossed relation during folding of the deck; each parallel arm being of foreshortenable construction, comprising connected sections adapted in extended condition to transmit loads in tension therethrough for leveling support of the deck while lift is applied to said lift arms and yieldable to a foreshortened condition for folding the deck into the linkage for stowing beneath said floor; an actuator connected between said lift arms and said mount and operable to transmit lift to said lift arms; and sturdy outboard brackets secured to the deck and supporting said deck pivots with the parallel arm-to-deck pivots spaced outwardly from the sides of the deck and outwardly of the lift arm-to-deck pivots.

2. Lift apparatus as defined in claim 1, wherein each outboard bracket comprises a broad bracket arm secured to the deck near the underside thereof and projecting laterally from the sides thereof, and a bracket finger projecting upwardly from an outer portion of said bracket arm and supporting the respective parallel arm pivot, said bracket finger being spaced outwardly from a respective lift arm and outwardly from the side of the deck to provide a clearance space in which the associated end portion of the respective lift arm is receivable in the folded position of the deck.

3. Lift apparatus as defined in claim 2, wherein the sections of each parallel arm are in longitudinally slidable relation to one another.

4. Lift apparatus as defined in claim 1, including means acting in tension between the sections of the respective parallel arms and yieldingly preloading them toward foreshortened condition so as to assist in said folding of the linkage.

5. Lift apparatus comprising: a loading-carrying deck; parallel arm linkage having at one end means including vertically-spaced deck pivots connecting it to said deck and at its other end having means including vertically-spaced mount pivots for mounting said other end beneath an elevated floor for upward swinging of said deck to a position extending horizontally outwardly from a margin of said floor, said linkage comprising laterally-spaced pairs of laterally-spaced arms, movable into crossed relation for folding of said deck into said linkage, each pair comprising a lift arm and a parallel arm, actuator means operable on said lift arms to swing them upwardly about their mount pivots, said lift arms being operable in compression for transmitting lift to said deck, and each parallel arm being of foreshortenable sectional construction, operable in an extended condition to transmit loads in tension therethrough for leveling support of the deck while lift is applied thereto by said lift arms, and yieldable to a foreshortened condition permitting upwardly and forwardly swinging folding of the deck into the linkage for stowing beneath and within the margin of said floor; an actuator operable on said lift arms for transmitting lift to said linkage; and means acting in tension between the sections of the respective parallel arms and yieldingly preloading them toward foreshortened condition; the upper deck pivot axis orbiting about the lower deck pivot axis during said folding, from a position above to a position below the common planes of the axes of the upper mount pivots and the lower deck pivots, whereby said tension means is operative to assist the movements of the deck toward a generally upwardly extending intermediate position, from its extended position and also from its position folded into the linkage.

6. Lift apparatus as defined in claim 5, wherein one section of each parallel arm includes a channel portion of rectangular cross section and the other section is of flat bar form, one of said sections having a longitudinal slot and the other having a guide pin extending through said slot.

7. In a lift apparatus for vehicles, in combination: a load-carrying deck; a parallel arm linkage having at one end vertically-spaced mount pivots for mounting the linkage to a vehicle and having at its other end spaced deck pivots connecting the linkage to the deck; actuator means operable between the vehicle and the linkage to swing the linkage upwardly about said mount pivots for elevating the deck; said linkage comprising laterally-spaced pairs of lift and parallel arms, the latter being normally disposed above said lift arms and each of said parallel arms comprising respective arm sections, one of which is a blade of flat bar form disposed in a vertical plane and the other of which is a scabbard in the form of a downwardly opening narrow channel having sides in embracing relation to said blade and a top web, said sides having longitudinal slots therein, and said blade having a transverse pin slidably engaged in said slots, said scabbard including a stop lip extending from one end of said web past said pin and engaged against the upper margin of said blade to prevent downward breaking of the respective parallel arm around the axis of said pin; said lift and parallel arms being substantially parallel when transmitting lift to the deck; said pin and slot parts constituting lost-motion means for change in effective length of each parallel arm of said linkage between its respective pivots such as to effect orbiting of the deck pivots around one another in a direction to effect upwardly swinging retraction of the deck toward the mount pivots and consequent folding of the deck into the linkage for stowing beneath the vehicle; said lost-motion means including means for limiting reverse length change of said last-mentioned arm so as to condition the linkage for elevating the deck in leveled attitude; and spring means acting on the sections of said parallel arms to assist the said orbiting of the deck pivots and the consequent upwardly swinging retraction of the deck, said spring means being disposed above said parallel arms and being operative to resist upward breaking thereof about the axis of said pins.

8. Lift apparatus as defined in claim 7, wherein said tension arms are disposed outwardly of said lift arms.

9. Lift apparatus as defined in claim 8, including outboard brackets secured to the deck and supporting said deck pivots with the parallel arm-to-deck pivots spaced outwardly from the sides of the deck and outwardly of the lift arm-to-deck pivots, each outboard bracket comprising a sturdy bracket arm secured to the deck near the underside thereof and projecting laterally from the sides thereof, and a bracket finger projecting upwardly from an outer portion of said bracket arm and supporting the respective parallel arm pivot, said bracket finger being spaced outwardly from a respective lift arm and outwardly from the side of the deck to provide a clearance space in which the associated end portion of the respective lift arm is receivable in the folded position of the deck.

10. Lift apparatus as defined in claim 7, including outboard brackets secured to the deck and supporting said deck pivots with the parallel arm-to-deck pivots spaced outwardly from the sides of the deck and outwardly of the lift arm-to-deck pivots, each outboard bracket comprising a sturdy bracket arm secured to the deck near the underside thereof and projecting laterally from the sides thereof, and a bracket finger projecting upwardly from an outer portion of said bracket arm and supporting the respective parallel arm pivot, said bracket finger being spaced outwardly from a respective lift arm and outwardly from the side of the deck to provide a clearance space in which the associated end portion of the respective lift arm is receivable in the folded position of the deck.

11. Lift apparatus for a vehicle, adapted to be stowed below the floor area of the vehicle, within the margin thereof, comprising: a load-carrying deck; parallel arm linkage having at one end means including vertically-spaced deck pivots connecting it to said deck and at its other end having means including vertically-spaced mount pivots for mounting said other end beneath an elevated floor for upward swinging of said deck to a position extending horizontally outwardly from a margin of said floor, said linkage comprising laterally-spaced pairs of arms, each pair comprising a compression arm and a tension arm, at least one arm of each pair being of sectional, foreshortenable construction such as to provide for orbiting of the deck pivots about one another to effect folding of the deck into the linkage for stowing beneath said floor, said compression arms being disposed adjacent and outwardly of the sides of the deck and said tension arms being disposed outwardly of said compression arms; and outboard brackets including sturdy bracket arms secured to the deck, projecting laterally outwardly therefrom, and having upwardly projecting fingers closely adjacent said tension arms and supporting the tension arm-deck pivots spaced outwardly from the sides of the deck; and actuator means for applying lift to said linkage.

12. Lift apparatus as defined in claim 11, wherein each outboard bracket comprises a bracket arm secured to the deck near the underside thereof and projecting laterally from the sides thereof, and laterally-spaced bracket fingers projecting upwardly from an outer portion of said bracket arm and supporting the respective tension arm pivot, the inner one of said bracket fingers being spaced outwardly from the side of the deck to provide a clearance space in which the associated end portion of the respective lift arm is receivable in the folded position of the deck, the compression arm deck pivots each including one end portion thereof securely anchored within the deck, its other end portion extending across said clearance space and into the nearer one of said bracket fingers and providing a portion of the support thereto.

References Cited
UNITED STATES PATENTS

| | | | |
|---|---|---|---|
| 2,715,470 | 8/1955 | Marcus et al. | 214—77 |
| 3,138,270 | 6/1964 | McCarty | 214—77 |
| 3,258,148 | 6/1966 | Appleman | 214—77 |
| 3,269,567 | 8/1966 | Lugash | 214—77 |
| 3,282,451 | 11/1966 | Corley | 214—77 |

ROBERT G. SHERIDAN, *Primary Examiner.*